United States Patent
Chou et al.

(10) Patent No.: US 9,791,747 B2
(45) Date of Patent: Oct. 17, 2017

(54) DISPLAY PANEL

(71) Applicant: Innolux Corporation, Miao-Li County (TW)

(72) Inventors: Ming-Lung Chou, Miao-Li County (TW); Chung-Jun Kuo, Miao-Li County (TW); Shih-Che Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 14/935,596

(22) Filed: Nov. 9, 2015

(65) Prior Publication Data

US 2016/0147104 A1 May 26, 2016

(30) Foreign Application Priority Data

Nov. 20, 2014 (TW) .............. 103140227 A

(51) Int. Cl.
*G02F 1/1333* (2006.01)
*G02F 1/1339* (2006.01)

(52) U.S. Cl.
CPC .......... *G02F 1/1339* (2013.01); *G02F 1/1333* (2013.01); *G02F 1/13394* (2013.01); *G02F 2001/13396* (2013.01)

(58) Field of Classification Search
CPC ............... G02F 1/1339; G02F 1/13394; G02F 2001/13396
See application file for complete search history.

(56) References Cited

U.S. PATENT DOCUMENTS

| 7,088,418 B1 | 8/2006 | Yamashita et al. |
| 8,629,966 B2 | 1/2014 | Chu et al. |
| 2007/0182912 A1* | 8/2007 | Kobayashi .......... G02F 1/13394 349/153 |

FOREIGN PATENT DOCUMENTS

| TW | I281579 | 5/2007 |
| TW | I392937 B1 | 4/2013 |

OTHER PUBLICATIONS

TIPO Office Action dated May 5, 2016 in corresponding Taiwan application (No. 103140227).
TW Office Action dated Oct. 28, 2015 in corresponding Taiwan application (No. 103140227).

* cited by examiner

*Primary Examiner* — Phu Vu
(74) *Attorney, Agent, or Firm* — McClure, Qualey & Rodack, LLP

(57) ABSTRACT

A display panel is provided. The display panel includes a first substrate, a blocking structure, and a seal layer. The first substrate has a display region. The blocking structure is disposed on the first substrate and located outside the display region, wherein the blocking structure includes a plurality of first blocking walls, and a distance between two adjacent first blocking walls is 7-50 μm. The seal layer is disposed on the first substrate and surrounds the first blocking walls, wherein each of the first blocking walls has a top surface, and the seal layer is in direct contact with at least one of the top surfaces.

9 Claims, 4 Drawing Sheets

DISPLAY PANEL

This application claims the benefit of Taiwan application Serial No. 103140227, filed Nov. 20, 2014, the subject matter of which is incorporated herein by reference.

BACKGROUND OF THE INVENTION

Field of the Invention

The present disclosure relates in general to a display panel, and more particularly to a display panel having excellent display quality.

Description of the Related Art

As the size of liquid crystal display (LCD) panels is getting smaller and smaller, the design of frames is directed towards minimization. Along with the reduction in the overall size, many steps in the manufacturing process involve higher level of difficulties and may even generate many problems, such as liquid crystal pollution and deteriorated display quality. Therefore, how to provide an LCD panel with excellent display effect has become a prominent task for the industries.

SUMMARY OF THE INVENTION

The present disclosure is directed to a display panel. In the display panel of the embodiments, the first blocking walls of the blocking structure are located outside the display region, and the seal layer surrounds the first blocking walls, such that width variation at the edge of the seal layer can be effectively controlled, the display medium is not polluted, and excellent display quality can be provided.

According to one embodiment the present disclosure, a display panel is provided. The display panel includes a first substrate, a blocking structure and a seal layer. The first substrate has a display region. The blocking structure is disposed on the first substrate and located outside the display region, wherein the blocking structure includes a plurality of first blocking walls, and a distance between two of the adjacent first blocking walls is 7-50 μm. The seal layer is disposed on the first substrate and surrounds the first blocking walls, wherein each of the first blocking walls has a top surface, and the seal layer is in direct contact with at least one of the top surfaces.

The above and other aspects of the invention will become better understood with regard to the following detailed description but non-limiting embodiment(s). The following description is made with reference to the accompanying drawings.

DETAILED DESCRIPTION OF THE INVENTION

Figure 1A:
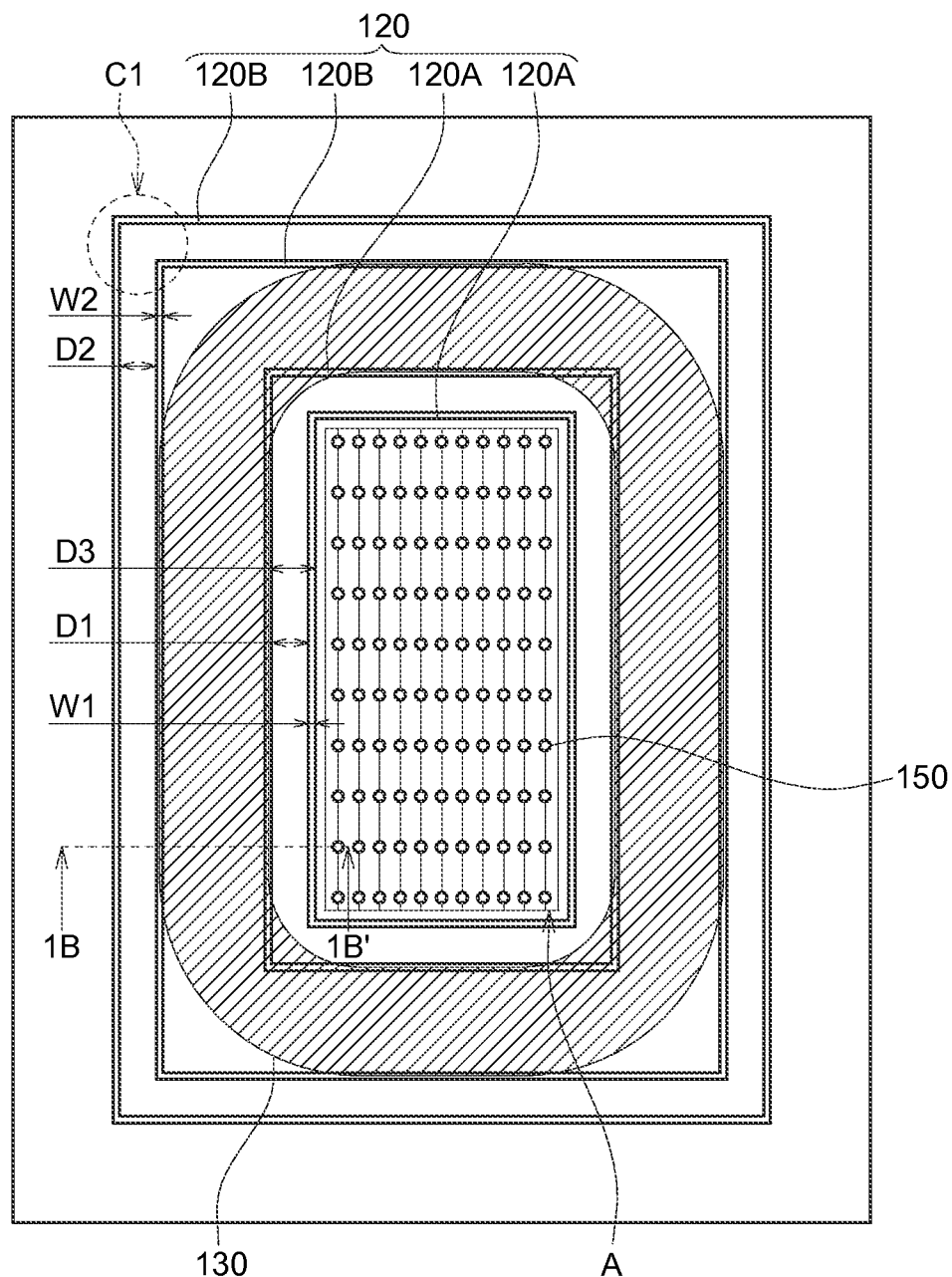
FIG. 1A is a top view of a display panel according to an embodiment of the present disclosure.

According to the embodiments of the present disclosure, in the display panel, the first blocking walls of the blocking structure are located outside the display region, and the seal layer surrounds the first blocking walls, such that width variation at the edge of the seal layer can be effectively controlled, the display medium is not polluted, and excellent display quality can be provided. Detailed descriptions of the present disclosure are disclosed below with accompanying drawings. In the accompanying drawings, the same reference numerals are used to represent the same or similar elements. It should be noted that the accompanying drawings are simplified so that the contents of the embodiments can be more clearly described. Also, detailed structures disclosed in the embodiments are for exemplification purpose only, not for limiting the scope of protection of the present disclosure. Anyone who is skilled in the technology field of the present disclosure can make necessary modifications or variations to these structures according to the needs in actual implementations.

Figure 1B:
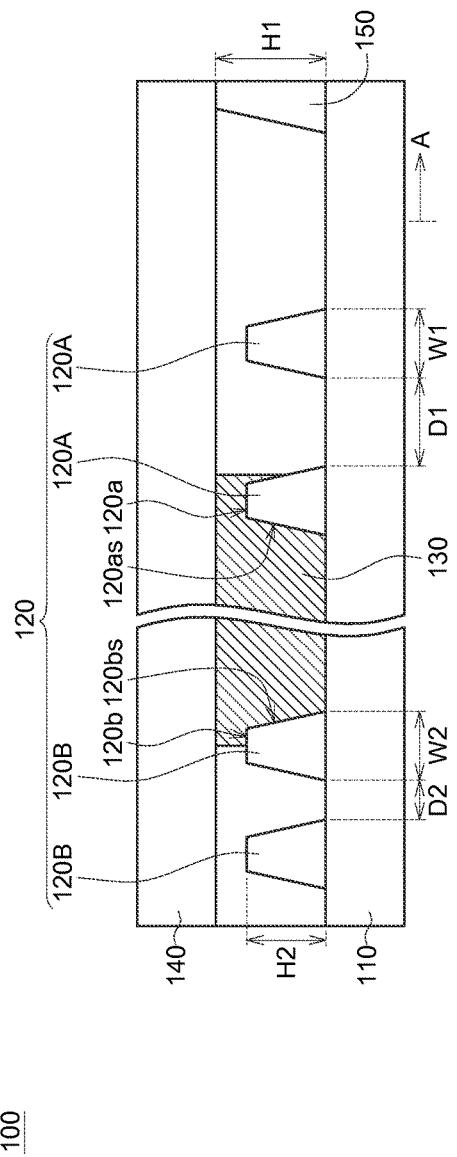
FIG. 1B is a cross-sectional view along the cross-sectional line 1B-1B' of FIG. 1A.

FIG. 1A is a top view of a display panel 100 according to an embodiment of the present disclosure. FIG. 1B is a cross-sectional view along the cross-sectional line 1B-1B' of FIG. 1A. As indicated in FIGS. 1A and 1B, the display panel 100 includes a first substrate 110, a blocking structure 120 and a seal layer 130. The first substrate 110 has a display region A. The blocking structure 120 is disposed on the first substrate 110 and located outside the display region A. The blocking structure 120 includes a plurality of first blocking walls 120A, and a distance D1 between two adjacent first blocking walls 120A is 7-50 microns (μm). The seal layer 130 is disposed on the first substrate 110 and surrounds the first blocking walls 120A. Each of the first blocking walls 120A has a top surface 120a, and the seal layer 130 is in direct contact with at least one of the top surfaces 120a.

In the embodiment as indicated in FIG. 1B, the cross-section of each of the first blocking walls 120A has such as a trapezoidal structure, and each of the first blocking walls 120A with a trapezoidal structure has a top surface 120a and sidewalls 120as. As indicated in FIG. 1B, the seal layer 130 is in direct contact with the top surface 120a and a sidewall 120as of the trapezoidal structure.

In the embodiment, the first blocking walls 120A of the blocking structure 120 are located between the display region A and the seal layer 130 and are capable of effectively resolving the problem of width variation at the edge of the seal layer 130. To put it in greater details, after the sealing material is coated on the first substrate 110, the first blocking walls 120A, being located between the display region A and the sealing material, can effectively prevent the sealing material from overflowing towards the display region A during the assembly of substrates. Since the blocking structure 120 effectively restricts the edge range of the seal layer 130, width variation at the edge of the seal layer 130 can be effectively controlled, the display medium is prevented from being polluted, and excellent display quality can be provided.

For example, the substrates of a display panel are assembled after having been coated with a sealing material for a width of 300 μm. While a display panel is not equipped with the first blocking walls 120A, the seal layer extends to a width of about 800 μm and overflows to cover a part of the display region A. Thus, the sealing material not only occupies the space of the display medium but also causes pollution and reduces the visibility of the display panel. On the contrary, according to the embodiments of the present disclosure, the substrates, having been coated with a sealing material for a width of 300 μm, are assembled under the conditions of the manufacturing process similar to the above-mentioned. Since the blocking structure 120 effectively restricts the expanding range of the sealing material, after the substrates are assembled, the width of the seal layer 130 is only about 700 μm. Moreover, a distance between the inner edge of the seal layer 130 and the outer edge of the display region A is only 130 μm. Therefore, according to the embodiments of the present disclosure, the above-mentioned features not only effectively resolve the problem of width variation at the edge of the seal layer 130 but also avoid the sealing material overflowing to the display region A, occupying the space of the display medium (formed of a liquid crystal material for example) and polluting the display medium. Thus, excellent display quality of the display panel can be provided.

In the embodiment, the cross-section of the blocking structure 120 has such as a trapezoidal structure. As indicated in FIG. 1B, the first blocking walls 120A of the blocking structure 120 have trapezoidal structures, and a distance D1 between two adjacent first blocking walls 120A defines the distance between the lower bases of two trapezoids.

As indicated in FIG. 1B, each of the first blocking walls 120A of the blocking structure 120 has a trapezoidal structure, the width W1 of each of the first blocking wall 120A defines the length of a lower base of the trapezoid. In an embodiment, each of the first blocking walls 120A has a width W1 of 7-100 μm. In another embodiment, each of the first blocking walls 120A has a width W1 of 12-23 μm.

In the embodiment, the blocking structure 120 is in direct contact with at least one part of the seal layer 130. As indicated in FIG. 1A, a first blocking wall 120A of the blocking structure 120 is in direct contact with at least one part of the seal layer 130, but the corner region C1 of the first blocking wall 120A is not in direct contact with the seal layer 130.

In the embodiment indicated in FIG. 1B, the seal layer 130 covers, for example, at least one of the first blocking walls 120A. As indicated in FIG. 1B, the seal layer 130 covers, for example, one of the top surfaces 120a and a sidewall 120as of at least one of the first blocking walls 120A.

It should be noted that the range by which the seal layer 130 contacts or covers the blocking structure 120 as indicated in FIGS. 1A and 1B is exemplary and explanatory only, not for limiting the range by which the seal layer 130 contacts and/or covers the blocking structure 120. For example, when there are three first blocking walls 120A (three rings of the first blocking walls 120A), the seal layer 130 may only cover two rings of the first blocking walls 120A.

As indicated in the display panel 100 of FIGS. 1A and 1B, the blocking structure 120 may further include a plurality of second blocking walls 120B surrounding the seal layer 130. In the present embodiment, the blocking structure 120 includes two first blocking walls 120A and two second blocking walls 120B. However, the quantities of the first blocking walls 120A and the second blocking walls 120B are not limited to the above exemplification, and can be properly adjusted according to actual needs.

In an embodiment as indicated in FIG. 1B, the cross-section of the second blocking walls 120B has such as a trapezoidal structure, and each of the second blocking walls 120B of the trapezoidal structures has a top surface 120b and sidewall 120bs. As indicated in FIG. 1B, the seal layer 130 is in direct contact with the top surface 120b and a sidewall 120bs of the trapezoidal structure.

In an embodiment as indicated in FIG. 1B, the seal layer 130 covers, for example, at least one of the second blocking walls 120B. To put it in greater details, in the embodiment as indicated in FIG. 1B, the seal layer 130 covers, for example, one of the top surfaces 120b and a sidewall 120bs of at least one of the second blocking walls 120B.

In an embodiment, a distance D2 between any two adjacent second blocking walls 120B is such as 7-50 μm. For example, two adjacent second blocking walls 120B are separated by a distance of 7-50 μm, and each of the second blocking walls 120B has a width W2 of 7-100 μm. In the embodiment, the cross-section of each of the second blocking walls 120B has a trapezoidal structure, and the distance D2 between two adjacent second blocking walls 120B defines the distance between the lower bases of two trapezoids.

In an embodiment as indicated in FIG. 1A, the inner edge of the seal layer 130 and the outer edge of the display region A are separated by a distance D3 of about 100-200 μm.

In the embodiment as indicated in FIGS. 1A and 1B, the display panel 100 may further include a second substrate 140 and a plurality of spacers 150 disposed between the first substrate 110 and the second substrate 140 and contacting the first substrate 110 and the second substrate 140. As indicated in FIG. 1A, the spacers 150 are located in the display region A. As indicated in FIG. 1B, each of the spacers 150 has a first height H1, the blocking structure 120 has a second height H2, and the first height H1 is greater than the second height H2. In the embodiment, the difference between the first height H1 and the second height H2 is such as 1-2 μm. In an embodiment, the first height H1 of each of the spacers 150 is such as 3.63-4.22 μm, and the second height H2 of the blocking structure 120 is such as 2.6-3.47 μm.

Let the display panel 100 be exemplified by an LCD panel. The spacers 150 are disposed between the first substrate 110 and the second substrate 140 and are in contact with the first substrate 110 and the second substrate 140 to provide a space for the disposition of liquid crystal materials. The second height H2 of the blocking structure 120 is shorter than the first height H1 of the spacer 150. That is, the blocking structure 120 does not contact the second substrate 140. Besides, there are grooves formed between the first blocking walls 120A, and the grooves are used as a buffer space. Thus, a gap is formed between the top end of the blocking structure 120 and the second substrate 140. When the substrates are assembled, the gap provides both a channel through which the sealing material inwardly overflows to the grooves between the first blocking walls 120A and a channel through which the liquid crystal materials outwardly overflow to the grooves between the first blocking walls 120A from the display region A. Since all space in the LCD panel is interposed, no vacuum space will be created in the structure of the assembled LCD panel, and the assembled LCD panel will be free of bubble-induced defects. In other words, according to the embodiments of the present disclosure, the width range of the seal layer 130 can be effectively controlled and restricted, and excellent display quality of the display panel can be provided.

In short, according to the embodiments of the present disclosure, the gap between the top end of the blocking structure 120 (such as the top surface 120a of the first blocking walls 120A) and the second substrate 140 in conjunction with the grooves between the first blocking walls 120A provide enough space for the sealing material or the liquid crystal materials to flow through, and can better control and resolve the problem of width variation of the seal layer 130. In other words, the sealing material flows to the gap between the top surface 120a of the first blocking walls 120A and the second substrate 140, such that the seal layer 130 is in direct contact with the top surface 120a of the first blocking walls 120A. In an embodiment, to achieve optimum effects and completely limit the width range of the seal layer 130, the blocking structure 120 only needs three first blocking walls 120A.

In the embodiment, the blocking structure 120 can be formed of an organic material or an inorganic material such as light curable polymer, or a material used for manufacturing light spacers or color filters. In an embodiment, the blocking structure 120 and the spacers 150 are formed of the same material, and then the blocking structure 120 and the spacers 150 can be formed in the same manufacturing process, such that the manufacturing process can be simplified and the manufacturing cost can be reduced. However, the material of the blocking structure 120 is determined according to actual needs, and any materials will do as long as the material is capable of effectively restricting the overflow range of the sealing material.

In the embodiment, the first substrate 110 and the second substrate 140 can be realized by such as a glass substrate. However, the material of the first substrate 110 and the second substrate 140 is determined according to actual needs, and is not limited to above exemplification.

According to the embodiments of the present disclosure, the blocking structure 120 may have an enclosed structure or a non-enclosed structure. In the embodiment, the bottom of the blocking structure 120 is completely jointed to the first substrate 110. In the embodiment, the blocking structure 120 can be realized by an enclosed or non-enclosed squared or ring structure. For example, as indicated in FIG. 1A, each of the first blocking walls 120A and the second blocking walls 120B of the blocking structure 120 has a squared structure, and the corner region C1 of the blocking structure 120 has a right angle. That is, each of the first blocking walls 120A and the second blocking walls 120B has a rectangular squared structure, and the first blocking walls 120A and the second blocking walls 120B completely surround and enclose the seal layer 130.

Figure 2:
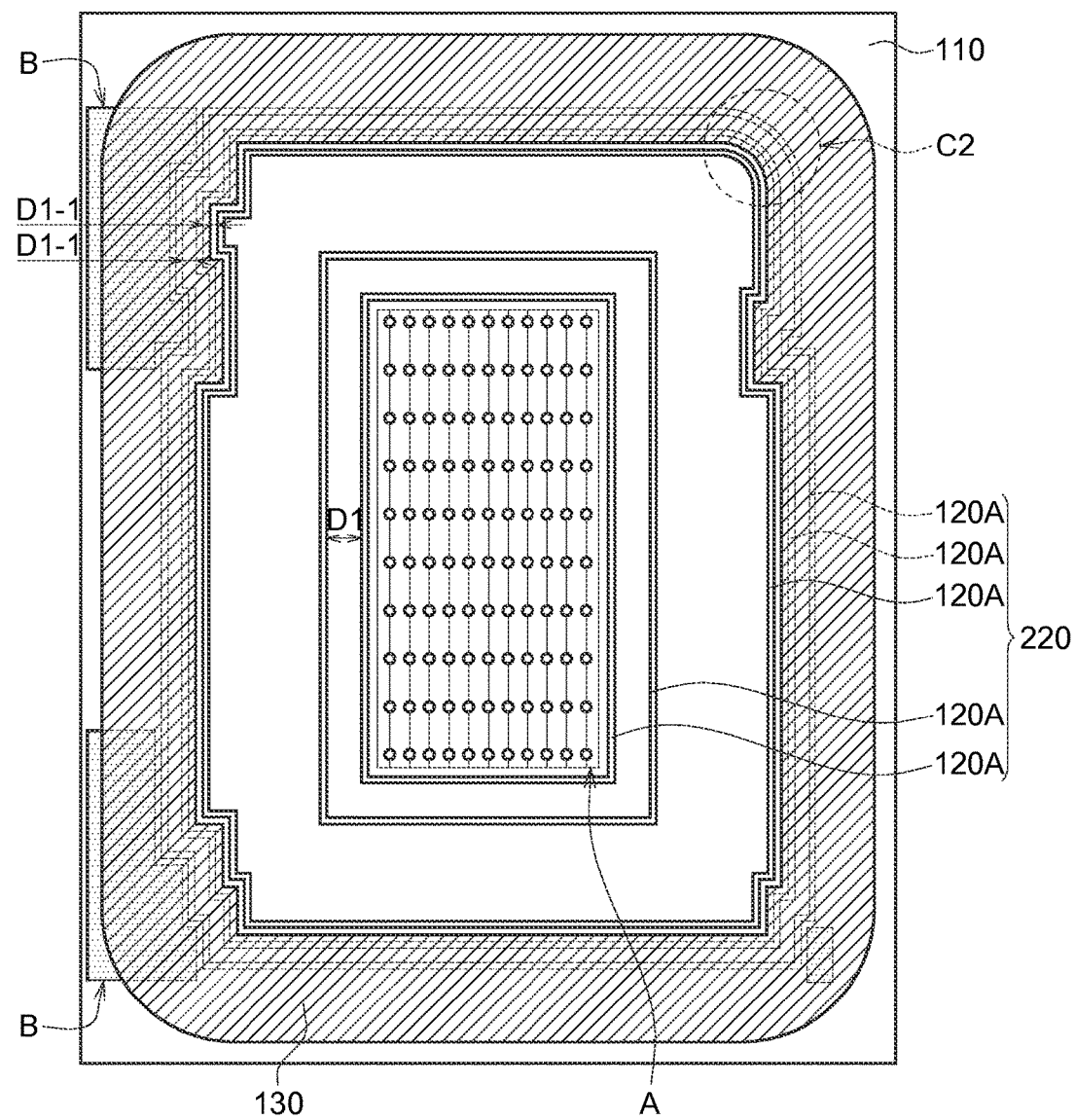
FIG. 2 is a top view of a display panel according to another embodiment of the present disclosure.

FIG. 2 is a top view of a display panel 200 according to another embodiment of the present disclosure. For elements the same with or similar to the present embodiment and above embodiments, the same or similar reference numerals are used to represent the same or similar elements, and detailed descriptions of the same or similar elements are made with reference to above disclosure, and are not repeated here.

As indicated in the display panel 200 of FIG. 2, the blocking structure 220 is a ring structure and includes five first blocking walls 120A. The blocking structure 220 may further include at least one second blocking wall 120B, and the quantities of the first blocking walls 120A and/or the second blocking walls 120B of the blocking structure 220 can be adjusted according to actual needs and are not limited to above exemplification.

In the embodiment as indicated in FIG. 2, the distance D1 of about 50 μm is formed between two first blocking walls 120A located near the display region A, and the distance D1-1 of about 30 μm is formed between two first blocking walls 120A located farther away from the display region A but closer to the outer edge of the display panel 200. The distance D1 and the distance D1-1 between adjacent first blocking walls 120A can be adjusted according to actual needs, and can be equivalent to or different from each other.

In the embodiment as indicated in FIG. 2, the corner region C2 of the blocking structure 220 has an arc with radius of curvature of 0-1000 μm. As indicated in FIG. 2, the regions of the blocking structure 220 may have irregular shapes other than rectangle, arc, and straight line. Since the blocking structure is capable of effectively restricting the range of the seal layer 130, the shape and distribution range of the seal layer 130 can be controlled through the design of the shape of the blocking structure.

As indicated in FIG. 2, the first substrate 110 may have at least one non-transparent region B, and the shape of at least one part of the blocking structure 220 is conformal with the shape of a part of the outline of the non-transparent region B. That is, the shape of the part of the blocking structure 220 adjacent to the non-transparent region B can be designed according to the shape of the outline of the non-transparent region B.

In an embodiment, the non-transparent region B can be realized by a metal wire region having a plurality of metal wires. The metal wire region may have a metal wire densely arranged region and a metal wire dispersedly arranged region. In the embodiment, the regions of the first blocking walls 120A of the blocking structure 220 may have different shapes. For example, one region is a straight line, while another region is a bending shape. The design of the shape of each region of the first blocking walls 120A is associated with the density of the metal wires arranged in the metal wire region. In the embodiment, the bending region of the first blocking walls 120A corresponds to the metal wire dispersedly arranged region of the metal wire region, and the straight line region of the first blocking walls 120A corresponds to the metal wire densely arranged region of the metal wire region.

In the embodiment, the metal wires disposed in the non-transparent region B are realized by a gate on panel (GOP) circuit, and the metal wires do not necessarily have a regular shape. According to the embodiments of the present disclosure, the first blocking walls 120A of the blocking structure 220 are disposed along the outer edge of the metal wire region, and the distribution range of the sealing material is limited to the position with lower aperture ratio such that the distribution range of the sealing material will not extend towards the transparent region. For example, the distribution range of the sealing material is outside the non-transparent region B. In the subsequent irradiation curing step, the sealing material can receive an effective amount of exposure to fully react and become cured, and avoid the pollution problem caused by the sealing material with incomplete reaction. The pollution problem is, for example, the pollution of the liquid crystal material.

Figure 3:
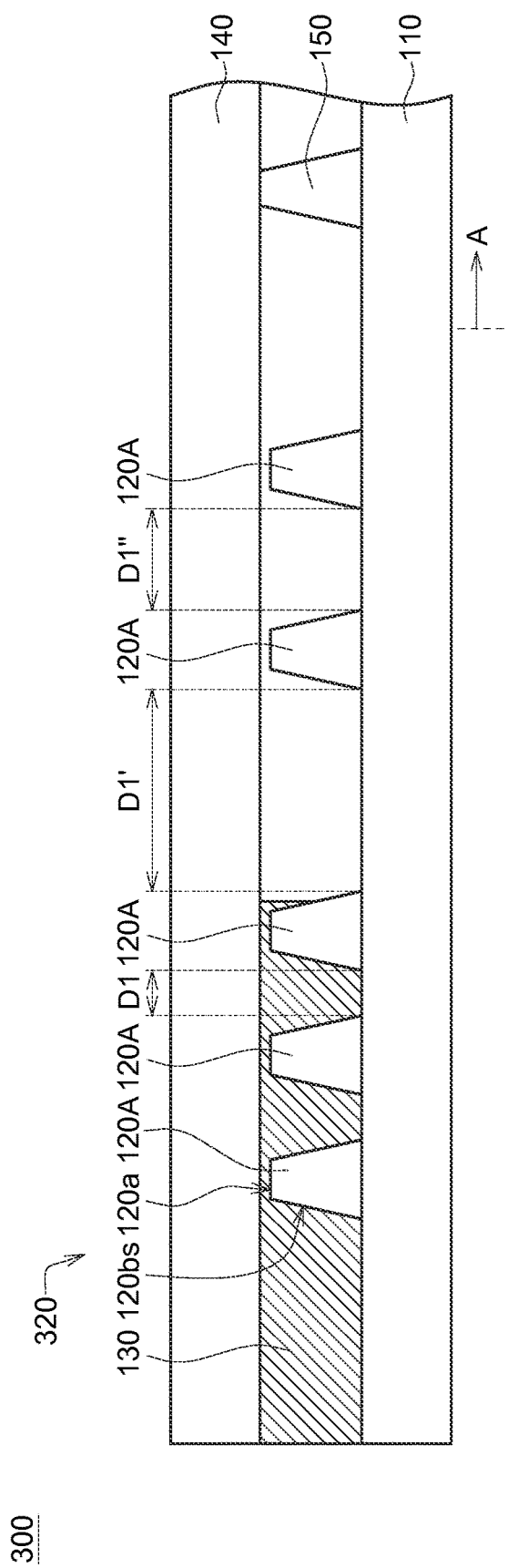
FIG. 3 is a partial cross-sectional view of a display panel according to an alternate embodiment of the present disclosure.

FIG. 3 is a partial cross-sectional view of a display panel 300 according to an alternate embodiment of the present disclosure. For elements the same with or similar to the present embodiment and above embodiments, the same or similar reference numerals are used to represent the same or similar elements, and detailed descriptions of the same or similar elements are made with reference to above disclosure, and are not repeated here.

As indicated in FIG. 3, the blocking structure 320 includes five first blocking walls 120A, and each distance between adjacent first blocking walls 120A can be identical or different. In the embodiment, the cross-section of each of the first blocking walls 120A of the blocking structure 320 has a trapezoidal structure, and each of the first blocking walls 120A of the trapezoidal structure has a top surface 120a and sidewall 120as. As indicated in FIG. 3, the seal layer 130 is in direct contact with the top surface 120a and a sidewall 120as of the trapezoidal structure.

In the embodiment as indicated in FIG. 3, the distance D1 between adjacent first blocking walls 120A, the distance D1' between adjacent first blocking walls 120A, and the distance D1″ between adjacent first blocking walls 120A are different from each other. In the embodiment, the distance between two adjacent first blocking walls 120A defines the distance between the lower bases of the trapezoids.

While the invention has been described by way of example and in terms of the embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display panel, comprising:
    a first substrate having a display region;
    a blocking structure disposed on the first substrate and located outside the display region, wherein the blocking structure comprises a plurality of first blocking walls, and a distance between two of the adjacent first blocking walls is 7-50 μm;
    a seal layer disposed on the first substrate and surrounding the first blocking walls, wherein each of the first blocking walls has a top surface, and the seal layer is in direct contact with at least one of the top surfaces, and wherein all of the first blocking walls completely enclose the display regions;
    a second substrate; and
    a plurality of spacers disposed between the first substrate and the second substrate and contacting the first substrate and the second substrate, wherein the spacers are located in the display region;
    wherein each of the spacers has a first height, the blocking structure has a second height, the first height is greater than the second height, and the difference between the first height and the second height is 1-2 μm.

2. The display panel according to claim 1, wherein each of the first blocking walls has a width of 7-100 μm.

3. The display panel according to claim 1, wherein the blocking structure further comprises a plurality of second blocking walls surrounding the seal layer.

4. The display panel according to claim 3, wherein a distance between any two of the adjacent second blocking walls is 7-50 μm, and each of the second blocking walls has a width of 7-100 μm.

5. The display panel according to claim 1, wherein the seal layer covers at least one of the first blocking walls.

6. The display panel according to claim 1, wherein an inner edge of the seal layer and an outer edge of the display region are separated, and a distance between the inner edge of the seal layer and the outer edge of the display region is 100-200 μm.

7. The display panel according to claim 1, wherein the first substrate has a metal wire region, the metal wire region having a metal wire densely arranged region and a metal wire dispersedly arranged region, and each of the first blocking walls has a bending region disposed corresponding to the metal wire dispersedly arranged region of the metal wire region.

8. The display panel according to claim 1, wherein the blocking structure has a squared shape or a ring shape, and the blocking structure has at least a corner region being a right angle or an arc with a radius of curvature of 0-1000 μm.

9. The display panel according to claim 1, wherein the first substrate has a non-transparent region, and the blocking structure has at least a part having a shape being conformal with a part of the outline of the non-transparent region.

* * * * *